(12) United States Patent
Hassan-Zade et al.

(10) Patent No.: US 7,198,193 B2
(45) Date of Patent: Apr. 3, 2007

(54) METHOD AND APPARATUS FOR IDENTIFYING A SET OF MULTIPLE ITEMS ON CONVEYOR SYSTEM WITH MULTIREAD TRANSPONDERS

(75) Inventors: Parvis Hassan-Zade, Morcote (CH); Roberto Dotti, Cadenazzo (CH); Takamasa Ishii, Ponte Capriasca (CH); Jean-Marc Jobin, Caslano (CH)

(73) Assignee: Datamars S.A., Bedano-Lugano (CH)

( * ) Notice: Subject to any disclaimer, the term of this patent is extended or adjusted under 35 U.S.C. 154(b) by 213 days.

(21) Appl. No.: 10/601,903

(22) Filed: Jun. 23, 2003

(65) Prior Publication Data

US 2004/0046022 A1 Mar. 11, 2004

Related U.S. Application Data

(60) Provisional application No. 60/391,402, filed on Jun. 24, 2002, provisional application No. 60/391,265, filed on Jun. 24, 2002.

(51) Int. Cl.
*G06F 19/00* (2006.01)
(52) U.S. Cl. .................. 235/385; 235/451; 235/492
(58) Field of Classification Search ............... 235/385, 235/381, 487, 451, 435, 492; 340/572, 720, 340/551, 825, 571.01; 324/307, 613
See application file for complete search history.

(56) References Cited

U.S. PATENT DOCUMENTS 3,832,530 A 8/1974 Reitboeck et al.
4,594,550 A * 6/1986 Yamada et al. ............. 324/307
4,623,877 A * 11/1986 Buckens .................. 340/572.2
5,565,846 A * 10/1996 Geiszler et al. .......... 340/572.2
5,648,765 A * 7/1997 Cresap et al. .............. 340/10.4
6,147,604 A * 11/2000 Wiklof et al. ............ 340/572.1
6,184,693 B1* 2/2001 Arai et al. .................. 324/613
6,201,474 B1* 3/2001 Brady et al. ............. 340/572.8
6,218,942 B1* 4/2001 Vega et al. ............... 340/572.1
2002/0044096 A1* 4/2002 Chung ........................ 343/742

FOREIGN PATENT DOCUMENTS

EP 1 041 504 A2 10/2000
WO 02/31789 A1 4/2002

* cited by examiner

*Primary Examiner*—Steven S. Paik
(74) *Attorney, Agent, or Firm*—Kenyon & Kenyon LLP (57) ABSTRACT

A three dimensional (3D) radio frequency antenna is positioned on one side of a conveyor which has a movable part for moving items, each of which has a radio frequency transponder, into and out of the antenna such that the items when in the antenna are completely surrounded by the antenna. The 3D antenna includes a plurality of coils which provide a 3D reading field in which all transponders in the reading field may be interrogated and also includes noise compensation coils at opposite ends of the reading field to minimize electromagnetic radiation from the antenna and also minimize noise from external sources. The radio frequency transponder includes a housing, a substrate within the housing, an integrated circuit and a printed circuit board mounted on the substrate. A coil is mounted on the substrate such as to be spaced therefrom with the spacing of the coil from the substrate enabling the encapsulant to completely surround the coil.

17 Claims, 9 Drawing Sheets

METHOD AND APPARATUS FOR IDENTIFYING A SET OF MULTIPLE ITEMS ON CONVEYOR SYSTEM WITH MULTIREAD TRANSPONDERS

CROSS REFERENCE TO RELATED APPLICATIONS

This application is based on and claims priority to U.S. Provisional Application Ser. Nos. 60/391,402, filed Jun. 24, 2002 by Parvis Hassan-Zade and Roberto Dotti entitled "MULTIREAD TRANSPONDER" and 60/391,265, filed Jun. 24, 2002 by Parvis Hassan-Zade and Roberto Dotti entitled "A METHOD AND APPARATUS FOR IDENTIFYING A SET OF MULTIPLE ITEMS ON A CONVEYOR SYSTEM WITH MULTIREAD TRANSPONDERS", the entire disclosure of each of the provisional applications is incorporated by reference herein.

BACKGROUND OF THE INVENTION

This invention is related to identifying multiple items with multiread transponders and, more particularly, to methods and apparatus for identifying a set of multiple items on a conveyor system using radio frequency multiread transponders.

Known radio frequency identification technology has the ability to identify multiple items simultaneously thanks to a multiread ability. A known common problem is the fact that if multiple items are placed randomly in a bag, a box or another carrier, it is necessary to read them in a three dimensional (3D) antenna. A 3D antenna is a combination of several coils placed in a 3D shape (cubic, cylindric or other shapes) generating a magnetic or electromagnetic field capable of activating transponders in any position. The shape of the antenna depends on the type of carrier which contains the items to be identified. In order for the items to be identified it is necessary that the items be surrounded by the coils of the antenna. This requires that all the items to be identified be placed inside the 3D antenna.

Very often those items are transported as a set of multiple items inside a carrier (bag, box or similar) hanging or laying on a conveyor system. In such cases it is necessary to build the antenna around the conveyor which gives several disadvantages like bigger antenna size, metal inside the antenna, motors inside the antenna.

SUMMARY OF THE INVENTION

It is an object of the present invention to provide methods and apparatus for identifying multiple items on a conveyor using radio frequency multiread transponders in which the conveyor is arranged to either lift up or move down the items to be identified so that they are placed within a three dimensional antenna thereby enabling the items to be identified.

It is a further object of the invention to provide a three dimensional antenna which is free of any extraneous devices within the antenna and minimizes the emission of magnetic or electromagnetic radiation outside of the antenna and also minimizes a magnetic or electromagnetic noise from outside of the antenna affecting reading of the items within the carrier.

It is still a further object of the present invention to provide a radio frequency transponder having a rugged construction, which is of small size, and which is capable of withstanding severe environmental conditions and, particularly, severe thermocycling of the type which may occur by repeated use in an industrial laundry.

These and other objects are achieved according to one aspect of the invention by methods and apparatus for identifying a plurality of items each of which has a radio frequency transponder. In accordance with this aspect, a conveyor is provided for conveying the items. A three dimensional radio frequency antenna is positioned on one side of the conveyor, the conveyor having a movable portion for moving the items into and out of the antenna such that the items when in the antenna are completely surrounded by the antenna. A reader is provided for sending interrogation signals to the transponders via the antenna and for reading identification information from the transponders.

In accordance with another aspect, the invention is directed to a radio frequency transponder which includes a housing; a substrate within the housing; a printed circuit board mounted on the substrate; a coil mounted on the substrate such as to be spaced therefrom; and an encapsulant for encapsulating the substrate, the printed circuit board, the integrated circuit chip and the coil, the spacing of the coil from the substrate enabling the encapsulant to completely surround the coil.

In accordance with still another aspect, the invention is directed to a radio frequency three dimensional antenna for use in reading information contained in radio frequency transponders. The antenna includes a plurality of cylindrical antenna coils structured and arranged within one another in a nested relationship, some of the coils being wound such that horizontal magnetic fields phase shifted at 180° and 90° may be generated and others of the coils being wound such that vertical magnetic fields phase shifted at 180° may be developed. The plurality of cylindrical antenna coils are further structured and arranged such as to define a three dimensional reading area and noise compensation area at opposite ends of the reading area.

The invention will now be explained in detail with reference to the accompanying drawings illustrating a preferred embodiment of the invention.

DETAILED DESCRIPTION OF THE PREFERRED EMBODIMENT(S)

Figure 1:
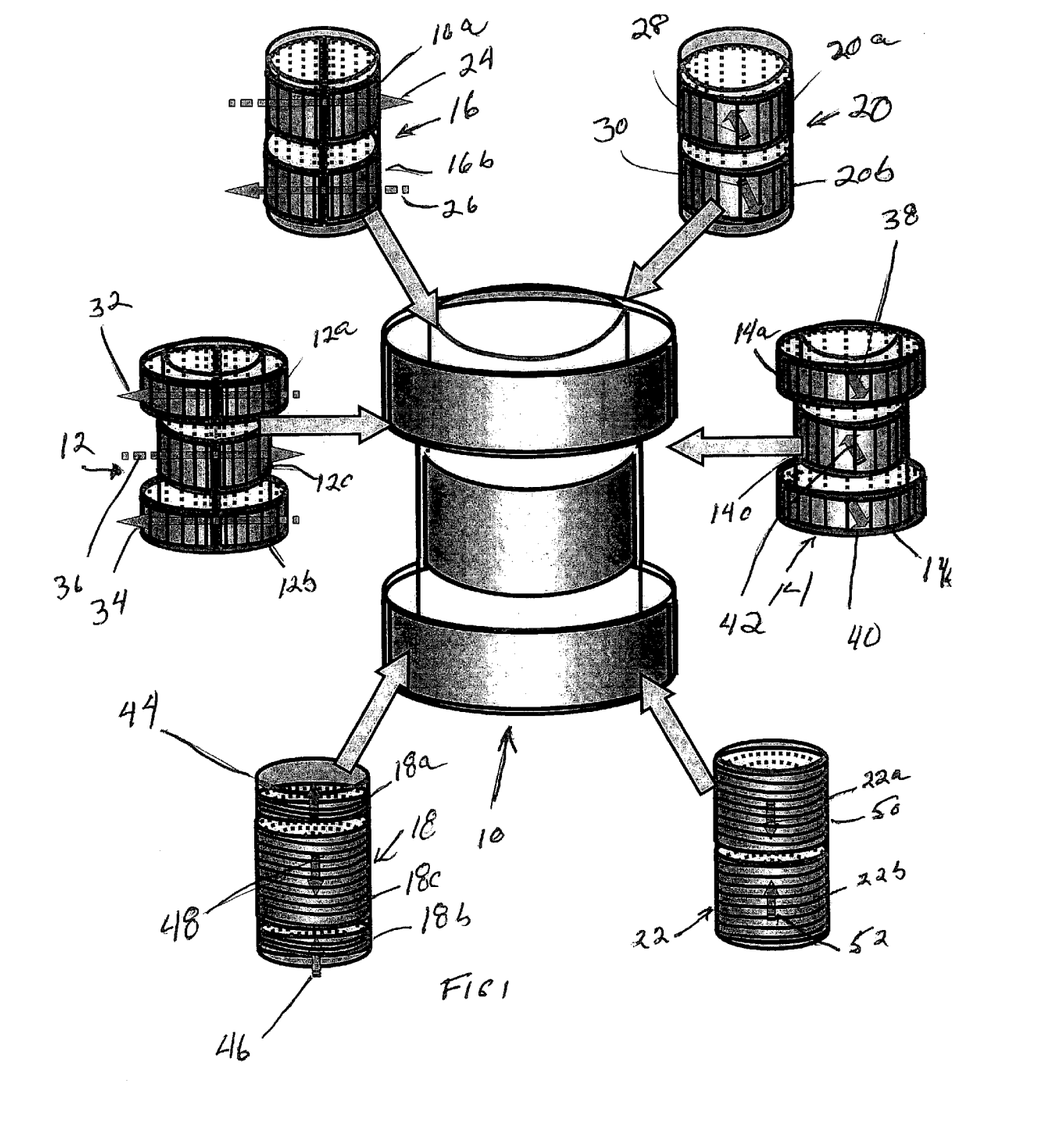
FIG. 1 is an exploded, perspective view of a three dimensional antenna illustrating certain features of the present invention.

Referring now to the drawings and, in particular to FIG. 1, there is shown a three dimensional (3D) cylindrical antenna 10 embodying certain features of the invention. The 3D antenna 10 is composed of six individual antenna coils 12, 14, 16, 18, 20 and 22.

The antenna coils are arranged in a nested relationship such that the antenna coils 12 and 14 which are designated horizontal middle antenna coils are nested within each other. The other antenna coils 16, 18, 20 and 22 are then nested within the horizontal middle antenna coils 12 and 14.

The antenna coils 16 and 20 each have an upper portion (16a, 20a) and a lower portion (16b, 20b), the coils of which are wound about a horizontal axis to provide horizontal magnetic fields with different directions of flux as shown by the arrows 24, 26, 28 and 30. More specifically, the upper portion 16a of the antenna coil 16 provides a magnetic field which is directed horizontally from left to right (arrow 24) as shown in FIG. 1, while the upper portion 20a of antenna coil 20 has a magnetic field (arrow 30) which is horizontal and at 90° to the direction of the magnetic field of the upper portion 16a of the antenna coil 16.

The lower portion 16b of antenna coil 16 is wound such that it provides a horizontal magnetic field (arrow 26) which is phase shifted 180° from the magnetic field (arrow 24) of the upper portion 16a. The lower portion 20b of the antenna coil 20 is wound such as to provide a magnetic field (arrow 30) which is 90° phase shifted from the magnetic field (arrow 26) of the lower portion 16b of the antenna coil 16 and is also 180° phase shifted from the magnetic field (arrow 28) of the upper portion of the antenna coil 20.

Each of the horizontal middle antenna coils 12, 14 has three portions, an upper portion (12a, 14a) a lower portion (12b, 14b) and a middle portion (12c, 14c), each of which is wound about a horizontal axis to provide a horizontal magnetic field in the direction shown in FIG. 1. More specifically, the coils 12a and 12b of the upper and lower portions of the antenna coil 12 are wound so that the magnetic fields (arrows 32 and 34) are in the same direction and the middle portion 12c of the antenna coil 12 is wound such that its magnetic field (arrow 36) is 180° phase shifted from the upper and lower portions.

The coils of the upper and lower portions 14a, 14b of the horizontal middle antenna 14 are wound such as to provide horizontal magnetic fields (arrows 38, 40) which are phase shifted 90° from the magnetic fields (arrows 32, 34) of the upper and lower portions 12a, 12b of the horizontal middle antenna 12 with the upper and lower portions 14a, 14b of the horizontal middle antenna 14 being oriented in the same direction and the middle portion 14c having a phase shift of 180° (arrow 42).

The antenna coil 18 which is designated a vertical middle antenna has three coil portions, an upper, a lower and a middle coil portion (18a, 18b, 18c), each of which is wound around a vertical axis to provide a vertical magnetic field with the magnetic fields (arrows 44, 46) of the upper and lower portions 18a and 18b being in the same direction and the magnetic field (arrow 48) of the middle portion 18c being phase shifted 180°.

The antenna coil 22 which is designated as a vertical upper and lower antenna has two coils 22a and 22b which are wound about a vertical axis to provide opposing vertical magnetic fields as shown by the arrows 50 and 52.

The upper and lower portions 16a, 16b of the antenna coil 16, the upper and lower portions 20a, 20b of the antenna coil 20, the upper and lower portions 12a, 12b of the antenna coil 12, the upper and lower portions 14a, 14b of the antenna coil 14 and the upper and lower portions 18a, 18b of the antenna coil 18 provide a noise compensation function. More specifically, the fields generated by these coils cooperate to reduce the emission of radiation from the 3D antenna 10 to comply with applicable government regulations and also act to minimize noise within the antenna 10 from external source.

The middle portion 12 of the antenna coil 12, the middle portion 14c of the antenna coil 14, the middle portion 18c of the antenna coil 18 and the upper and lower portions 22a, 22b of the antenna coil 22 function to define a cylindrical reading portion to interrogate and read the identification codes of the transponders associated with items to be identified, as will be described in more detail below. Thus, the 3D antenna 10 has a reading portion bounded on the top and bottom by noise compensation portions.

Figure 2A:
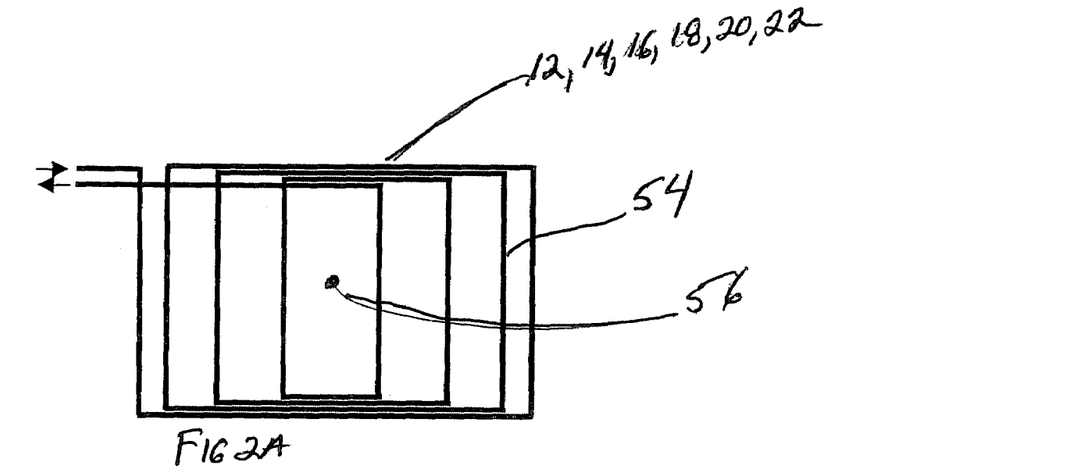
FIGS. 2A & 2B are diagrammatic orthogonal views respectively of an individual antenna coil used in the three dimensional antenna of FIG. 1.
Figure 2B:
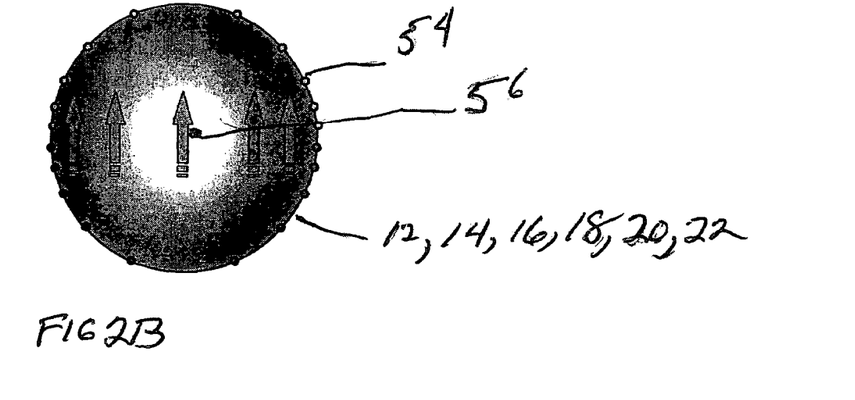

As seen from FIGS. 2A and 2B, the turns 54 of each of the coils 12, 14, 16, 18, 20 and 22 have unequal spacing to provide a homogenous reading field. More specifically, the distance between the turns 54 increase when approaching the axis 56 of the coil. If the spacing were equal then the magnetic field would increase from outside to inside resulting in a non-homogenous magnetic field.

Figure 3:
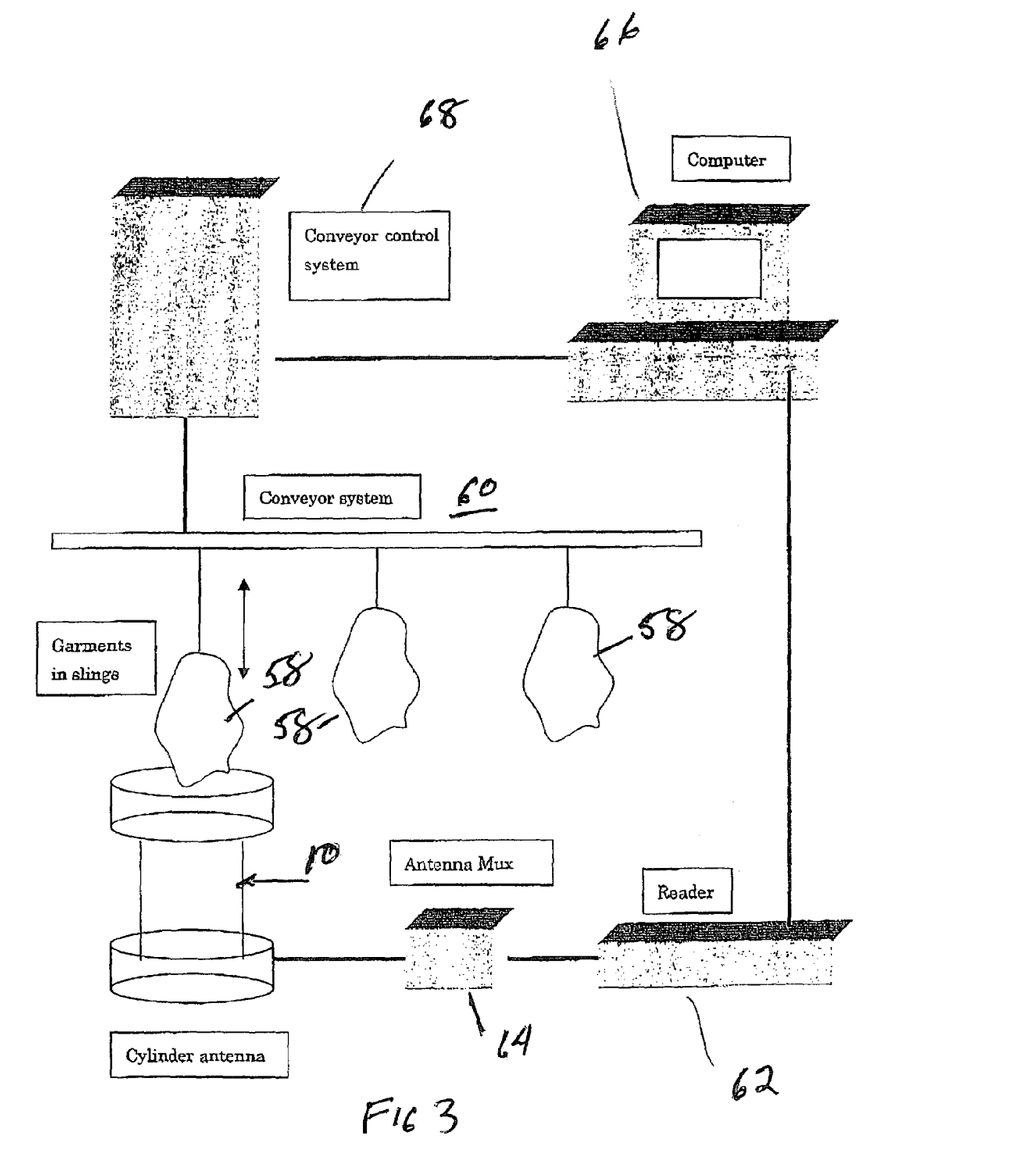
FIG. 3 is a diagrammatic block diagram of a system illustrating certain features of the present invention for identifying multiple items on a conveyor with multiread transponders and using the three dimensional antenna of FIG. 1.

A block diagram of an embodiment of the invention for identifying items, such as garments in slings 58 being transported by a conveyor system 60 is shown in FIG. 3. Each of the garments has a transponder (not show in FIG. 3) which will be described in greater detail below. As each sling 58 is conveyed into a position above a cylindrical 3D antenna, such as the antenna 10 of FIG. 1, the sling 58 is lowered into the antenna 10. The antenna coils 12, 14, 16, 18, 20 and 22 (FIG. 1) are then energized by a reader 62 which may be a Datamars D1 via an antenna multiplex unit 64. This causes the antenna coils 12, 14, 16, 18, 20 and 22 (FIG. 1) to generate magnetic fields in the directions shown in FIG. 1 which then result in interrogation of the transponders and resultant identification of the garments via the transponders. Suitable means, such as a computer 66, is provided to control the interrogation and reading of the transponders and also to control the conveyor system through a suitable controller 68, such as a Programmed Logic Control unit (PLC).

Figure 4:
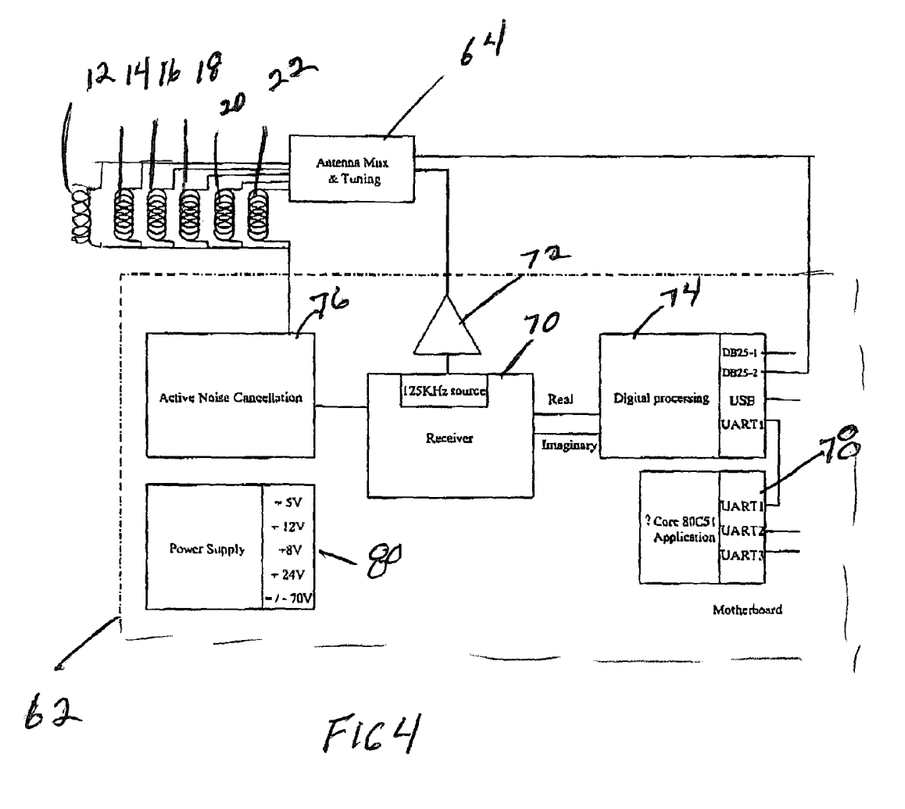
FIG. 4 is a more detailed block diagram of portions of FIG. 3.

A more detailed block diagram of the reader 62 is shown in FIG. 4. Each of the antenna coils 12, 14, 16, 18, 20 and 22 is connected to the multiplexer 64 which, in turn, is connected to a receiver/transmitter 70 via an amplifier 72. The antenna coils 12, 14, 16, 18, 20 and 22 are energized sequentially causing the transponders (not shown) to generate return signals. The received return signals from the transponders are then sent to a digital processor 74 to identify the transponder. The signals received from the antenna coils 12, 14, 16, 18, 20 and 22 include both noise and the actual signal. An active noise cancellation unit 76 is used to remove noise. The active noise cancellation unit 76 provides signals similar to the reading signals received from the antenna coils 12, 14, 16, 18, 20 and 22 but based only on noise in the system. Essentially, the active noise cancellation unit 76 creates a small transmission system inside of the reader 62 which creates the same transmission situation as to the actual system but without any signals received from the transponders. In the digital processing unit 74, the noise cancellation signal is subtracted from the received signals so that the signal processed by the digital processing 74 unit is only the actual read signals received from the transponders.

The digital processing unit 74 is controlled by an on board microprocessor. Alternatively, the digital processing unit may be controlled by an external computer. A power supply 80 is provided to supply power to the reader 64.

The antennas coils 12, 14, 16, 18, 20 and 22 work sequentially under the control of the multiplexer 64 thereby providing a sequential reading field which results in a fractioning of the reading field.

The coils 12, 14, 16, 18, 20 and 22 of the antenna 10 have a low Q (quality factor). The signals transmitted from the reader 62 to the transponders are modulated ASK (Amplitude Shift Keying) signals. If the modulation transition from 100% to 0% (OFF) or 0% to 100% (ON) is imperfect, the reader 64 is not able to transmit correct information to the transponders. Using lower Q antennas accelerates the transition from Off to On and vice versa. Thereby enhancing the accuracy of the reading.

Figure 5A:
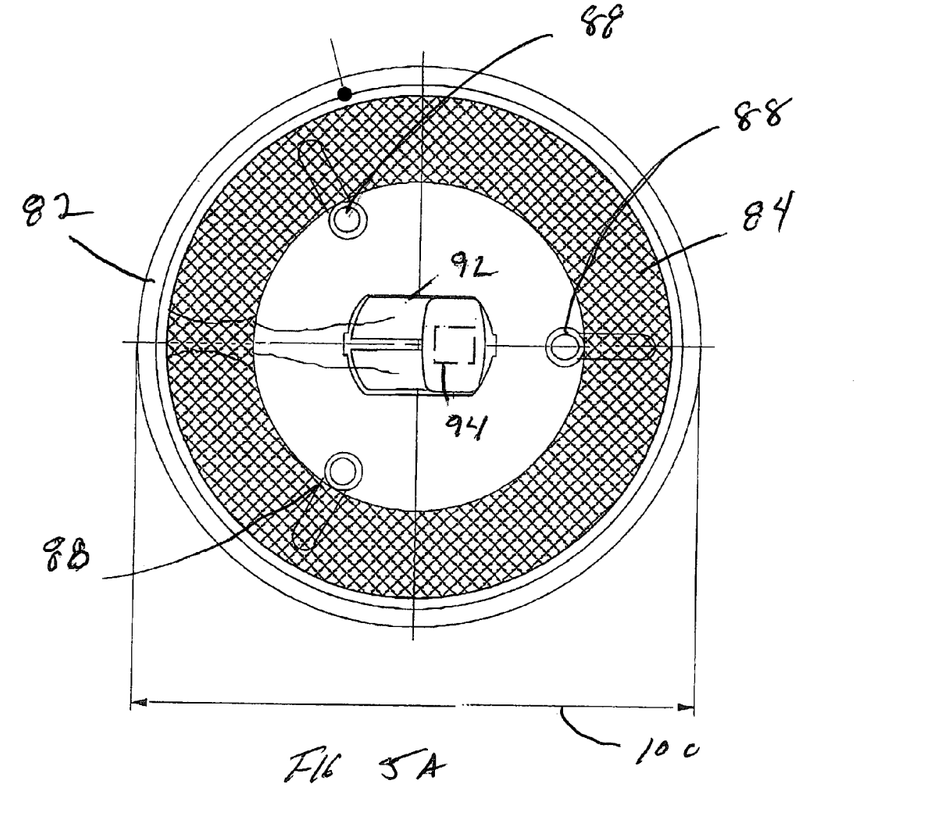
FIG. 5A is a cross-sectional elevational view of a transponder illustrating certain features of the present invention.
Figure 5B:
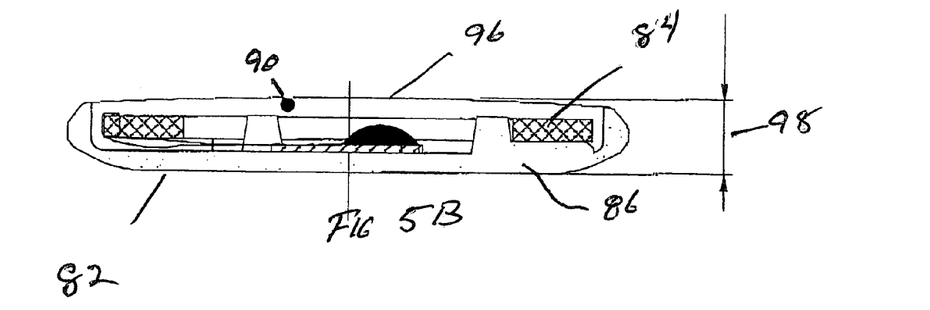
FIG. 5B is a cross-sectional plan view of the transponder.

FIGS. 5A and 5B are cross sectional elevation and cross sectional plan views, respectively, of a transponder 82, such as a Datamars T-BT9200, illustrating certain features of the present invention. The transponder 82 includes a coil 84 mounted on a substrate 86 with spacers 88 so as to enable encapsulating material 90 to completely encircle the coil 84 thereby providing protection and a rugged construction which enables the transponder to withstand severe environmental conditions, such as the repeated temperature changes which might be encountered when the transponder is embedded in clothing subjected to multiple washings.

The coil 84 is connected via a printed circuit board 92 to an integrated circuit chip 94. The transponder 82 includes a suitable housing 98 which may be made of PPS plastic, for example. The construction of the transponder enables the transponder to be minimized in size. For example, the thickness 98 of the transponder may be less than 3 mm and the diameter 100 may be less than 22 mm.

Figure 6:
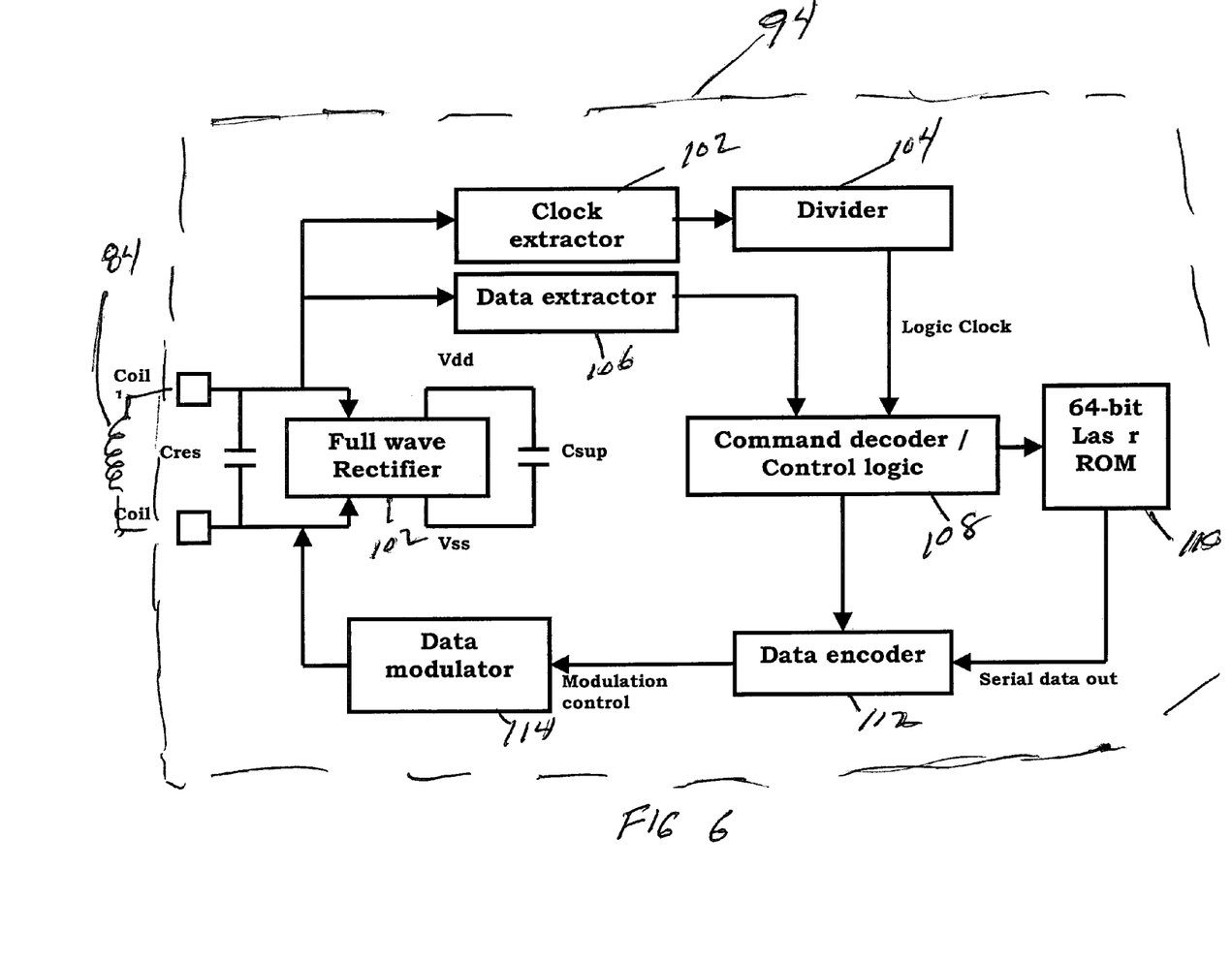
FIG. 6 is an electrical schematic of the transponder.

Electrically, referring to FIG. 6 which is a detailed block diagram of the integrated circuit chip 94, the signals transmitted by the 3D antenna are received by the coil 84 which is in resonance with a capacitor Cres. A capacitor Csup provides a DC voltage or voltages for operating the remainder of the circuitry through a full wave rectifier 102. The signals received from the coil 84 also are sent to a clock extractor 104 and then to a divider 106 to provide a clock signal for sequencing operations in the reader. Data contained in the signal received from the reader is extracted from a data extractor 106 and sent to a command decoder/logic control circuit 108. The command decoder/control logic circuit 108 interrogates a ROM 110 which contains an identification code for the transponder 82 being interrogated. The information from the ROM 110 is then coded by a data encoder 112, modulated by a data modulator 114 and then transmitted to the reader via the coil 84. It should be noted that locating the capacitor Cres in the integrated circuit 94 enables minimization of the transponder 82.

When a plurality of transponders are capable of being simultaneously present in an interrogation space, measures must be taken to prevent interference between the signals from the transponders. To this end, the reader 64 provides control logic data logic and software providing an "anti-collision" protocol.

Assuming that data is transmitted in binary form, the communication protocol employed must enable the simultaneous reception of a "0" and a "1" from different transponders 82 to be recognized and resolved. Further, the reception of the "0" or the "1" must still be reliably achieved if a number of transponders 82 simultaneously transmit that same value.

The protocol employed in the present system is based upon binary coding having the characteristics of the known Manchester II Code. In the Manchester II code, the values "0" and "1" are distinguished not by different high and low logic levels but by the position of a high logic level in either the first half or the second half of a defined bit period. There is, therefore, a logic transition at the middle of each bit period, the binary value of data being represented by the direction of the transition.

The reader 62 alternately echoes back to the transponders 82 a binary value corresponding to the value last received. In the event of a clash, i.e., different values transmitted from different transponders 82 during the same bit period, the reader 62 echoes back to the transponders 82 only a predetermined single value from the transponder(s) 82. The transponder(s) 82 which did not transmit that value then cease transmission. This process continues until one of the transponders 82 has transmitted and has echoed back to the reader 62 bit by bit all of its message. That transponder 82 then ceases transmission (i.e., is placed in a quiet mode) and the remaining transponders 82 recommence operation until by repetition of the process all of the individual transponder messages have been transmitted and echoed back. The reader 62 can specify the code number of a transponder 82 and put it in the quiet mode immediately. As there is more than one antenna in the reading system, one transponder 82 could be read more than one time with several different antennas (maximum of six times with six different antennas). If a transponder 82 is read one time, it is useless that that transponder be read again. Accordingly, once a transponder 82 is read with an antenna, the reader 62 puts the transponder 82 in the quiet mode before starting readings with the next antenna. In this way, the time needed for reading is less than reading a transponder several times with several different antennas because the time needed for putting the transponders in a quiet mode is much less than the time for reading them.

Further detail on the anti-collision protocol employed can be found in U.S. Pat. No. 5,323,149, the entire disclosure of which is incorporated by reference herein. Alternatively, an anti-collision system as disclosed in WO 00/54209, the entire disclosure of which is incorporated by reference herein, may be employed.

The three dimensional antenna employed may have either have the cylindrical shape shown in FIGS. 1 and 3 or any other suitable shape, such as cubical.

Figure 7A:
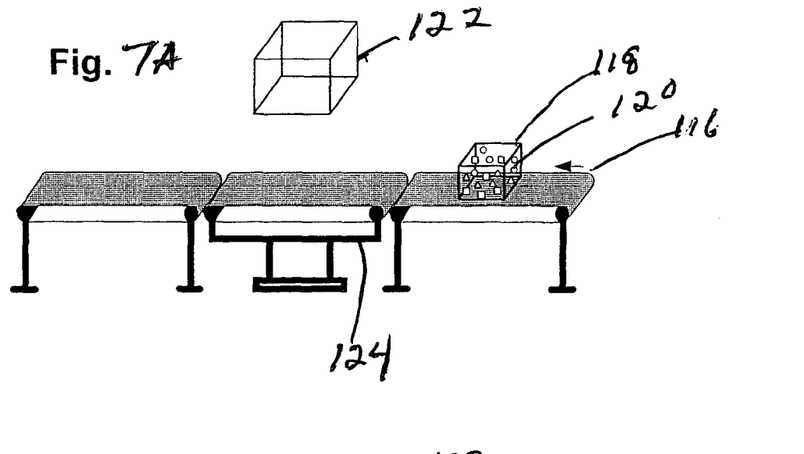
FIGS. 7A–7C are diagrammatic views of stages in a system illustrating certain features of the present invention for identifying of a plurality of items contained in a box which is transported on a flat belt conveyor.

Referring now to FIG. 7A, there is diagrammatically shown an embodiment of the invention in which a flat bed conveyor 116 transports a box 118 containing a plurality of item 120. The items 120 may be placed in any position in the box 118. The system employs a cubic shape antenna 122 which is positioned above the conveyor 116 which has a vertically movable portion 124.

Figure 7B:
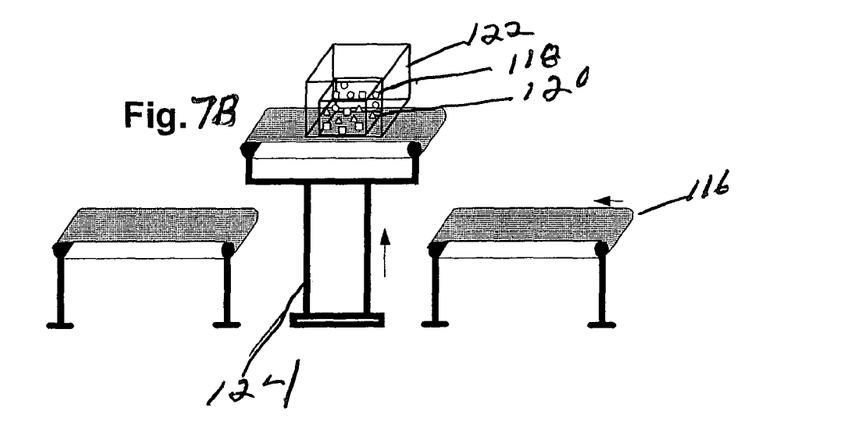

When, as shown in FIG. 7B, the box 118 is positioned directly under the antenna 122, the movable conveyor portion 124 is raised such that the box 118 is moved into the antenna 122 such that it is completely encompassed by the antenna 122. In this position, all of the items 120 inside the box 118 are surrounded by the antenna 122 thus enabling the items 120 (i.e., their associated transponders) to be interrogated and read.

Figure 7C:
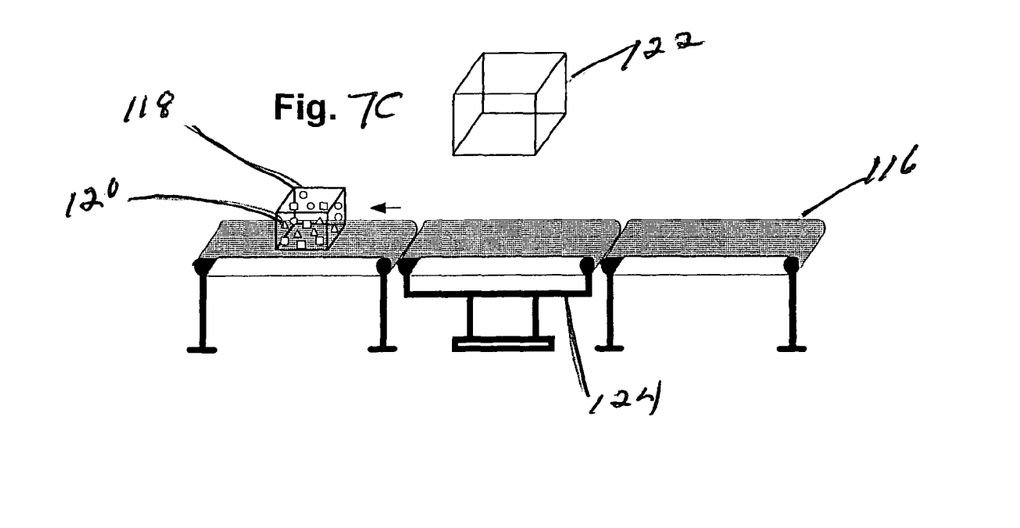

As shown in FIG. 7C, after the reading of the contents 120 of the box 118, the movable conveyor portion 124 is then moved downwardly. The box 118 then continues along the conveyor 116.

Figure 8A:
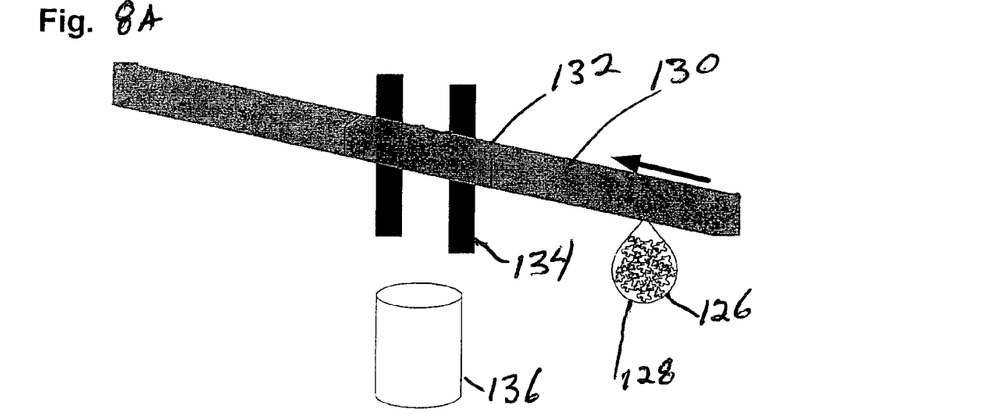
FIGS. 8A–8E are diagrammatic views showing stages in a system in an industrial laundry for identifying items in a bag in which the three dimensional antenna is placed below the conveyor carrying the bag and the bag is moved downwardly into the three dimensional conveyor.

Turning now to FIG. 8A, there is shown an embodiment of the invention employed in an industrial laundry where a bag 126 containing textile items 128, is transported with a conveyor 130 to one or more, processing station, such as washing machines (not shown). One part 132 of the conveyor 130 is mounted on a vertically movable mechanism 134 to enable it to be lifted up and down. An antenna 136 is positioned below the movable part 132 of the conveyor 130.

Figure 8B:
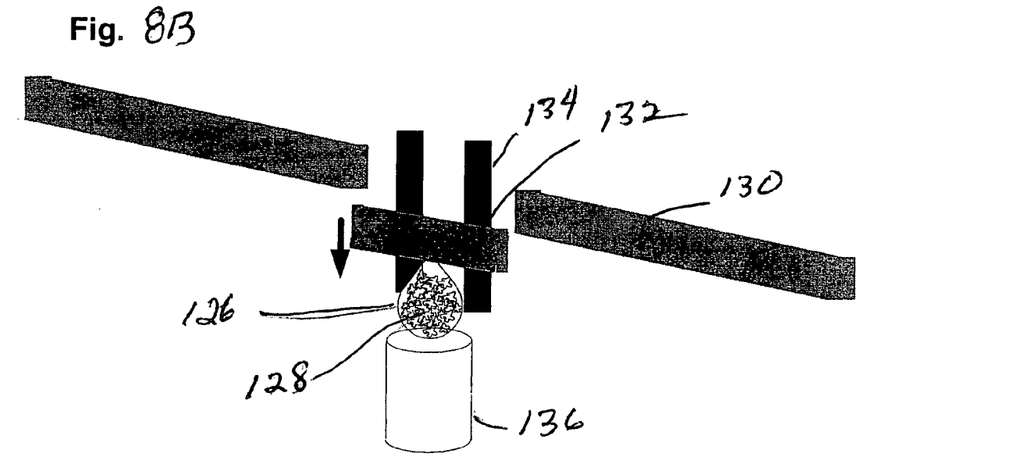

Once the bag 128 reaches the movable part 132 of the conveyor (FIG. 8B), the moveable part 132 of the conveyor is moved downwardly so that the bag 128 is placed inside the antenna 136.

Figure 8C:
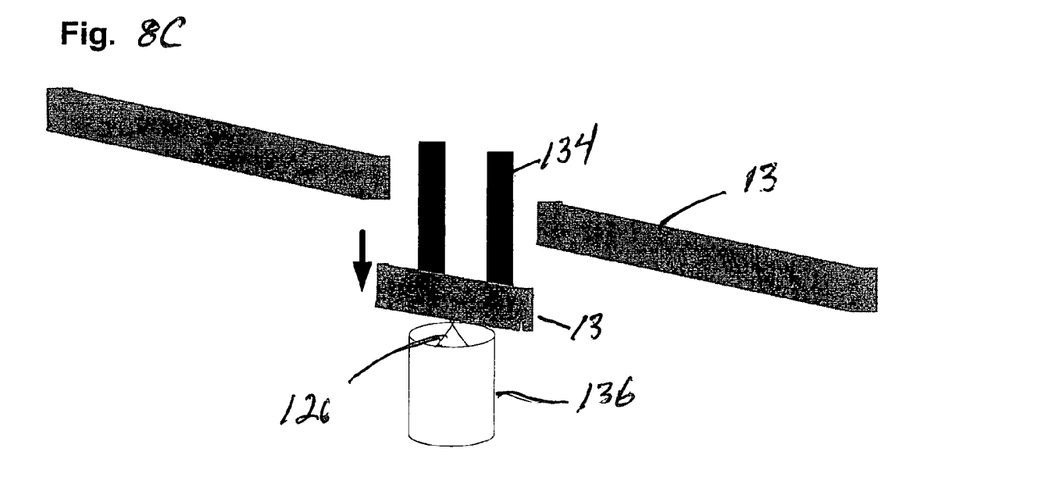

At the stage shown in FIG. 8C, the movable part 132 of the conveyor has reached its lowermost position and the bag 126 is completely surrounded by the antenna 136. This enables the reading of all of the item 126 inside of the bag 126.

Figure 8D:
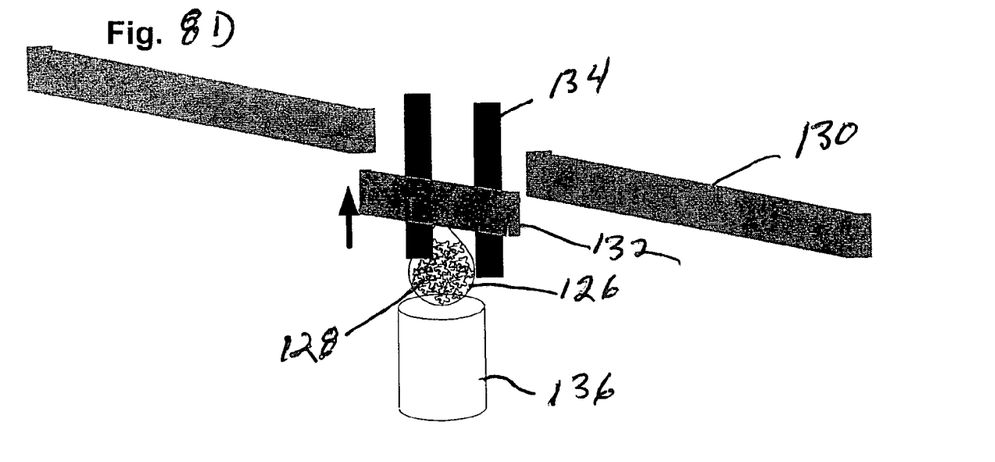
Figure 8E:
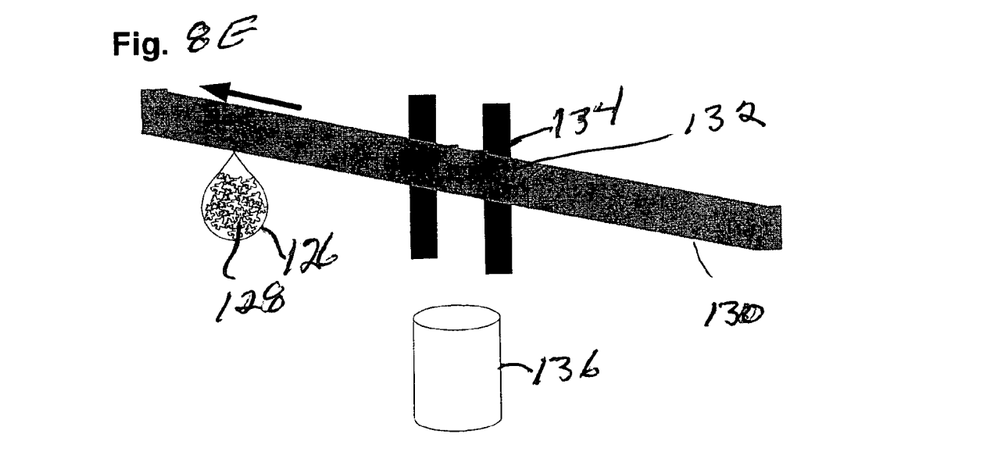

Once the contents 128 of the bag 126 are read, the conveyor portion 132 is then lifted back to its original position (FIG. 8D) and the bag 126 continues its travel on the conveyor 130 (FIG. 8E).

It should be noted that only those bags 126 containing items 128 with a transponder need to be moved down to the antenna. Empty bags 126 or bags 126 containing items without a transponder move past the moving part 132 of the conveyor without being moved down.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. Apparatus for identifying a plurality of items each of which has a radio frequency transponder, which apparatus comprises:
   a conveyor for conveying the items;
   a three dimensional radio frequency antenna positioned on one side of the conveyor, the conveyor having a movable part for moving the items into and out of the antenna such that the items when in the conveyor are completely surrounded by the antenna;
   a reader for sending interrogation signals to the transponders via the antenna and for reading identification information from the transponders, wherein the three dimensional antenna comprises a plurality of coils mounted in a three dimensional arrangement to provide a three dimensional reading field in which all transponders in the reading field may be interrogated,
means for interrogating the coils defining the reading field sequentially until all transponders are identified, and
means for, after a transponder is identified, placing the transponder in a quiet mode to prevent that same transponder from responding to interrogation signals from the antenna.

2. The apparatus in accordance with claim 1, wherein the antenna has at least two coils having a 180° phase shift between their magnetic fields, the coils being structured and arranged in such a way as to reduce undesired electromagnetic noise from affecting the reading field.

3. The apparatus in accordance with claim 1 wherein the antenna has at least two coils having a 180° phase shift between their magnetic field, the coils being structured and arranged in such a way as to minimize electromagnetic radiation emitted outside of the antenna.

4. Apparatus for identifying a plurality of items each of which has a radio frequency transponder, which apparatus comprises:
   a conveyor for conveying the items;
   a three dimensional radio frequency antenna positioned on one side of the conveyor, the conveyor having a movable part for moving the items into and out of the antenna such that the items when in the conveyor are completely surrounded by the antenna; and
   a reader for sending interrogation signals to the transponders via the antenna and for reading identification information from the transponders, wherein the three dimensional antenna comprises a plurality of coils mounted in a three dimensional arrangement to provide a three dimensional reading field in which all transponders in the reading field may be interrogated, in which the antenna includes compensation coils with magnetic fields having a 180° phase shift positioned at the external limits of the reading area such that the magnetic fields outside of the reading area are insufficient to interrogate and read transponders outside the reading field.

5. Apparatus for identifying a plurality of items each of which has a radio frequency transponder, which apparatus comprises:
   a conveyor for conveying the items;
   a three dimensional radio frequency antenna positioned on one side of the conveyor, the conveyor having a movable part for moving the items into and out of the antenna such that the items when in the conveyor are completely surrounded by the antenna; and
   a reader for sending interrogation signals to the transponders via the antenna and for reading identification information from the transponders, wherein the three dimensional antenna comprises a plurality of coils mounted in a three dimensional arrangement to provide a three dimensional reading field in which all transponders in the reading field may be interrogated, wherein the radio frequency transponder comprises:
   a housing;
   a substrate within the housing;
   a printed circuit board mounted on the substrate;
   an integrated circuit mounted on the substrate;
   a coil mounted on the substrate, wherein the coil is spaced from the substrate by a plurality of spacer elements extending between the substrate and the coil, an encapsulant encapsulating the substrate, the printed circuit board, the integrated circuit chip and the coil, the spacing of the coil from the substrate enabling the encapsulate to completely surround the coil.

6. Apparatus for identifying a plurality of items each of which has a radio frequency transponder, which apparatus comprises:
   a conveyor for conveying the items;
   a three dimensional radio frequency antenna positioned on one side of the conveyor, the conveyor having a movable part for moving the items into and out of the antenna such that the items when in the conveyor are completely surrounded by the antenna; and
   a reader for sending interrogation signals to the transponders via the antenna and for reading identification information from the transponders, wherein the three dimensional radio frequency antenna comprises:
a plurality of cylindrical antenna coils arranged within one another in a nested relationship, some of the coils being wound such that horizontal magnetic fields phase shift at 180° and 90° may be generated, and others of the coils being wound such that vertical magnetic fields with phase shifts of 180° may be developed;

the plurality of cylindrical antenna coils being further arranged such that a three dimensional reading area is developed and noise compensation areas are developed at opposite ends of the reading area.

7. Apparatus for identifying a plurality of items each of which has a radio frequency transponder, which apparatus comprises:

a conveyor for conveying the items;

a three dimensional radio frequency antenna positioned on one side of the conveyor, the conveyor having a movable part for moving the items into and out of the antenna such that the items when in the conveyor are completely surrounded by the antenna; and a reader for sending interrogation signals to the transponders via the antenna and for reading identification information from the transponders, wherein the three dimensional radio frequency antenna comprises:

a plurality of cylindrical antenna coils arranged within one another in a nested relationship, some of the coils being wound such that horizontal magnetic fields phase shift at 180° and 90° may be generated, and others of the coils being wound such that vertical magnetic fields with phase shifts of 180° may be developed;

the plurality of cylindrical antenna coils being further arranged such that a three dimensional reading area is developed and noise compensation areas are developed at opposite ends of the reading area, wherein each coil has turns with unequal spacing between them so that the magnetic field developed by the coil is homogeneous.

8. Apparatus for identifying a plurality of items each of which has a radio frequency transponder, which apparatus comprises:

a conveyor for conveying the items;

a three dimensional radio frequency antenna positioned on one side of the conveyor, the conveyor having a movable part for moving the items into and out of the antenna such that the items when in the conveyor are completely surrounded by the antenna; and a reader for sending interrogation signals to the transponders via the antenna and for reading identification information from the transponders, wherein the three dimensional radio frequency antenna comprises:

a plurality of cylindrical antenna coils arranged within one another in a nested relationship, some of the coils being wound such that horizontal magnetic fields phase shift at 180° and 90° may be generated, and others of the coils being wound such that vertical magnetic fields with phase shifts of 180° may be developed;

the plurality of cylindrical antenna coils being further arranged such that a three dimensional reading area is developed and noise compensation areas are developed at opposite ends of the reading area, wherein the coils are wound about respective axes and the distance between turns of the coils increase when approaching the respective axis.

9. A radio frequency transponder comprises:

a housing a substrate within the housing;

a printed circuit board mounted on the substrate;

an integrated circuit mounted on the substrate;

a coil mounted on the substrate, wherein the coil is spaced from the substrate by a plurality of spacer elements extending between the substrate and the coil, and an encapsulant encapsulating the substrate, the printed circuit board, the integrated circuit chip and the coil, the spacing of the coil from the substrate enabling the encapsulate to completely surround the coil.

10. A three dimensional radio frequency antenna comprising:

a plurality of cylindrical antenna coils arranged within one another in a nested relationship, some of the coils being wound such that horizontal magnetic fields phase shift at 180° and 90° may be generated, and others of the coils being wound such that vertical magnetic fields with phase shifts of 180° may be developed;

the plurality of cylindrical antenna coils being further arranged such that a three dimensional reading area is developed and noise compensation areas are developed at opposite ends of the reading area.

11. The apparatus according to claim 10, wherein each coil has turns with unequal spacing between them so that the magnetic field developed by the coil is homogeneous.

12. The apparatus according to claim 10, wherein the coils are wound about respective axis and the distance between turns of the coils increase when approaching the respective axis.

13. The apparatus accordance with claim 10 wherein the plurality of coils mounted in a three dimensional arrangement such as to provide a three dimensional reading field in which all transponders in the reading field may be interrogated.

14. The apparatus in accordance with claim 13, wherein the coils defining the reading field are interrogated sequentially until all transponders are identified.

15. The apparatus in accordance with claim 13, wherein at least two of the coils have a 180° phase shift between their magnetic fields, the coils being structured and arranged in such a way as to reduce undesired electromagnetic noise from affecting the reading field.

16. The apparatus in accordance with claim 13, wherein at least two coils have a 180° phase shift between their magnetic field, the coils being structured and arranged in such a way as to minimize electromagnetic radiation emitted outside the antenna.

17. The apparatus in accordance with claim 13, in which some of the coils are compensation coils with magnetic fields having 180° phase shift positioned at the external limits of the reading area such that the magnetic fields outside of the reading area are sufficient to interrogate and read transponders outside the reading field.

* * * * *